(12) United States Patent
Kim

(10) Patent No.: US 6,333,569 B1
(45) Date of Patent: Dec. 25, 2001

(54) PULSE WIDTH MODULATION METHOD OF INVERTER

(75) Inventor: Hee-jung Kim, Suwon (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/725,096

(22) Filed: Nov. 29, 2000

(30) Foreign Application Priority Data

Sep. 23, 2000 (KR) .................................................. 00-55974

(51) Int. Cl.[7] .................................................. H02J 1/00
(52) U.S. Cl. .................................................. 307/31
(58) Field of Search ................. 307/13, 31, 32, 307/35, 36

(56) References Cited

U.S. PATENT DOCUMENTS

| | | | |
|---|---|---|---|
| 5,627,742 | 5/1997 | Nakata et al. | 363/98 |
| 5,910,892 | 6/1999 | Lyons et al. | 363/98 |
| 6,219,265 | * 4/2001 | Bernet et al. | 363/137 |
| 6,259,616 | * 7/2001 | Ekwall et al. | 363/132 |

* cited by examiner

*Primary Examiner*—Shawn Riley
(74) *Attorney, Agent, or Firm*—Staas & Halsey LLP

(57) ABSTRACT

Disclosed is a pulse width modulation method of a three-level inverter comprising a pair of condensers connected in series to each other, having a neutral point, and a plurality of switching devices. The method comprises the steps of obtaining effective offset voltages within an established control cycle of the inverter; calculating a switching loss in the switching devices according to each effective offset voltage supplied to the inverter; calculating a current flowing at the neutral point within the control cycle when each effective offset value is supplied; normalizing the calculated switching loss and the current flowing at the neutral point; and adding a predetermined weight to at least one of the normalized switching loss and the normalized neutral point current to select the offset voltage where the sum of the normalized switching loss and the normalized neutral point current is maximized. With this method, the voltage balance of the DC terminals may be appropriately maintained, and a switching loss may be reduced, thereby decreasing an electric loss of the inverter.

3 Claims, 4 Drawing Sheets

PULSE WIDTH MODULATION METHOD OF INVERTER

FIELD OF THE INVENTION

The present invention relates in general to pulse width modulation methods of three-level inverters, and more particularly, to a pulse width modulation method of a three-level inverter, thereby enabling reduction of electric loss of the inverter.

DESCRIPTION OF THE RELATED ART

Typically, a three-level inverter has a pair of condensers connected in series with each other, having a neutral point, and a plurality of switches connected to their respective coils for switching on and off the coils. The three-level inverter has been used in comparatively high-capacity systems. In the three-level converter, the term "level" means a state of voltage; and thus, "three-level" means "three states of voltages."

A three-level inverter has a plurality of a pair of voltage vectors, the pairs of voltage vectors indicating the same output voltages. While the pairs of voltage vectors indicate the same output voltages, they influence reversely upon change of voltages at direct current (DC) terminals. One voltage vector of the pair of voltage vectors raises the voltage of a condenser whereas the other voltage vector drops the voltage of that condenser reversely. Thus, if the voltage vector pairs are appropriately used, the same output voltages can be obtained, thereby maintaining a balance of voltages of the DC terminals.

For example, referring to FIG. 2 which is a view showing output vectors of a three-level inverter according to the present invention, applicable output vectors where a command vector is located at Sector 1 have two sequences as in (0,0,0) →(1,0,0)→(1,1,1) and (0,0,0)→(0,0,-1)→(0,-1,-1,) →(-1,-1,-1) Either of these two sequences is selected depending upon a desired balancing state of the voltages of the DC terminals. Where the command vector is located at Sector 3, the vectors (1,0,0) and (0,-1,-1) indicate the same output voltages, but they reversely affect the voltages of the DC terminals. Using this property, the balance of the voltages of the DC terminals can be maintained by properly adjusting the ratio of time during which the voltages are supplied to the two vectors.

However, if a space vector pulse width modulation method is used to synthesize the command vectors, the calculation is very complicated, thereby giving a burden to a CPU. Further, according to the above-described method, since a continuous pulse width modulation method under which switching is performed at all the three phases is used, loss in switching is increased compared with a discontinuous pulse width modulation method. Where voltages are synthesized using a triangle pulse comparison method or the space vector pulse width modulation method, switching operations are generated at all the three phases within a control cycle, thereby increasing the switching loss as compared with the discontinuous pulse width modulation method.

In the DC terminals of the three-level inverter, since two condensers are connected in series with each other and the respective condensers are not connected to a constant voltage source, the voltages of the two condensers easily vary according to the current flowing at the neutral point of the DC terminals. In this case, distortion is generated in the output voltages, and stable operation of power devices cannot be assured.

SUMMARY OF THE INVENTION

Therefore, the present invention has been made in view of the above shortcomings, and it is an object of the present invention to provide a pulse width modulation method of an inverter which can obtain a voltage balance between DC terminals and reduce the loss in switching, thereby permitting production of miniaturized and lightweight inverters.

This and other objects of the present invention may be achieved by a provision of a pulse width modulation method of a three-level inverter comprising a pair of condensers connected in series to each other, having a neutral point, and a plurality of switching devices, comprising the steps of obtaining effective offset voltages within an established control cycle of the inverter; calculating a switching loss in the switching devices according to each effective offset voltage supplied to the inverter; calculating a current flowing at the neutral point within the control cycle when each effective offset value is supplied; normalizing the calculated switching loss and the current flowing at the neutral point; and adding a predetermined weight to at least one of the normalized switching loss and the normalized neutral point current to select the offset voltage which the sum of the normalized switching loss and the normalized neutral point current is maximized.

Preferably, the switching loss calculation step comprises the sub-steps of obtaining a first loss difference between the maximum switching loss and the minimum switching loss; obtaining second loss differences between the maximum switching loss and the respective switching losses; and dividing each second loss difference by the first loss difference.

Preferably, the neutral point current calculation step comprises the sub-steps of obtaining a first current difference between the maximum current value and the minimum current value; obtaining second current differences between the maximum current value and the respective minimum current values; and dividing each second current difference by the first current difference.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Figure 1:
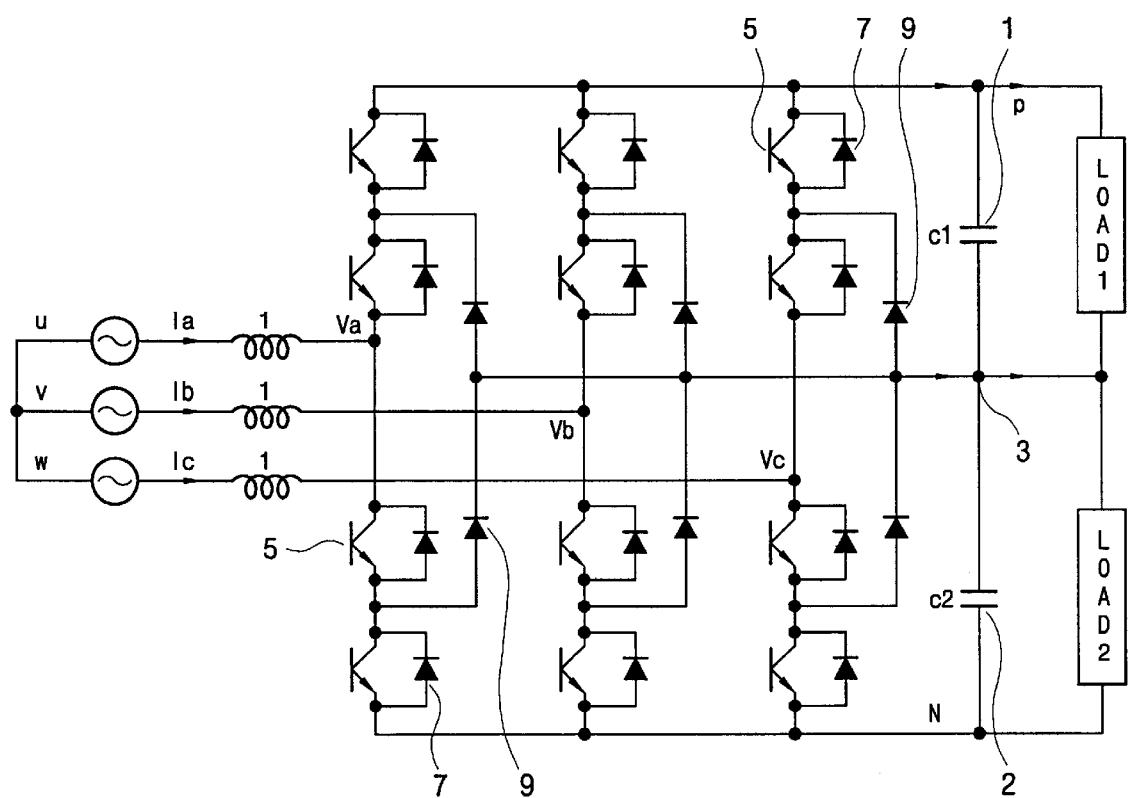
FIG. 1 is a schematic circuit diagram of a three-level inverter according to the present invention.

Referring to FIG. 1, a three-level inverter according to the present invention is comprised of a pair of condensers 1 and 2 connected in series to each other, having a neural point 3, and a switching unit switching on and off coils connected to phases, for example, U-phase, V-phase and W-phase. The switching unit includes four transistors 5 in each phase (U, V and W) and a diode 7 connected between both ends of each transistor 5. The three-level inverter is provided with two clamping diodes 9 in each phase (U, V and W), and each clamping diode 9 is connected to the neutral point 3. The term "three level" in the three-level inverter means three voltage states of each phase (U, V and W) (for example, Vdc/2,0,-Vdc/2). Thus, in case of using the three-level inverter, there exist a total of 27 switching states.

Figure 2:
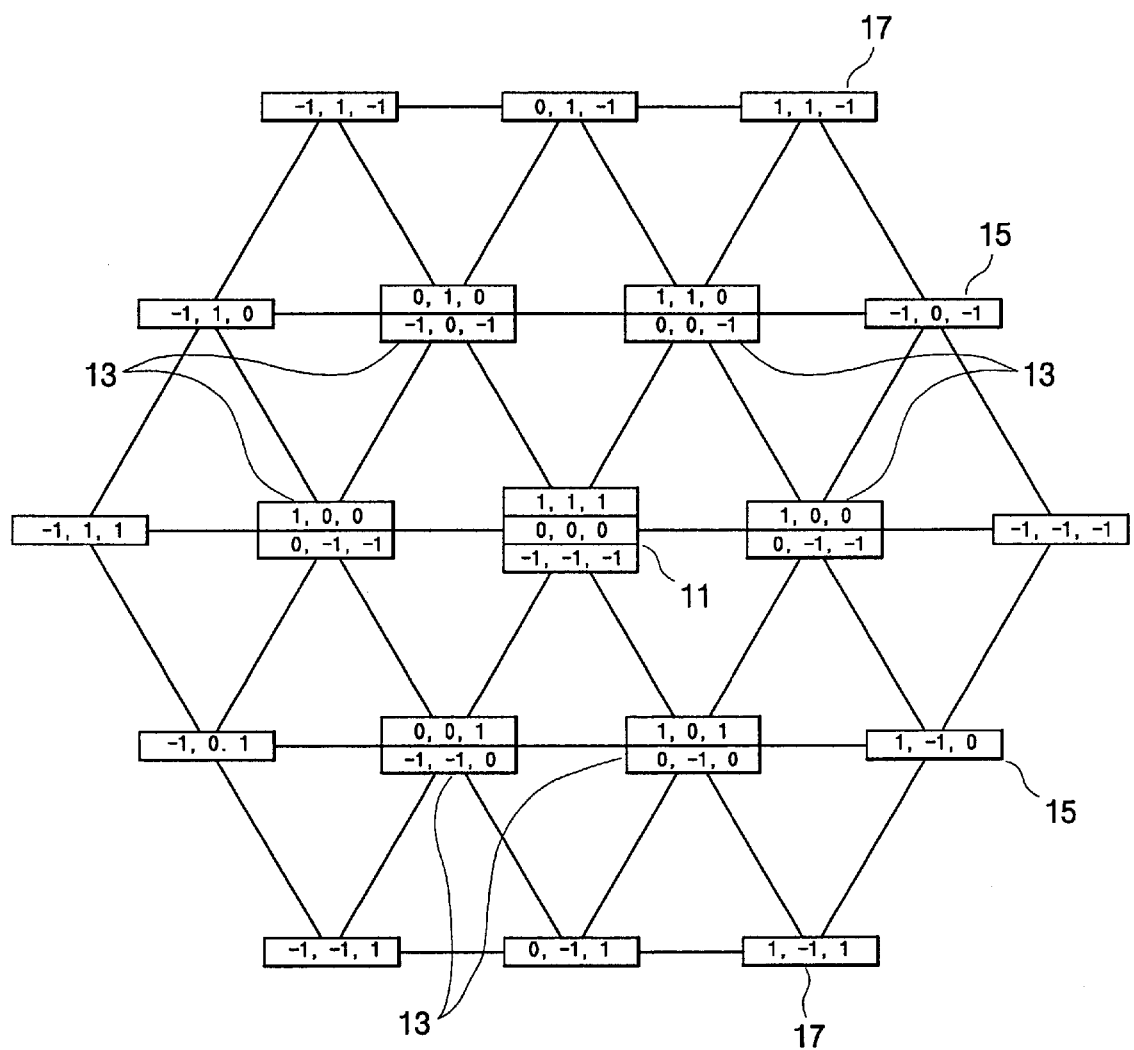
FIG. 2 is a view showing output vectors of a three-level inverter according to the present invention.

Referring to FIG. 2, the three-level inverter has an output vector parts indicating 27 switching states. The output vector part includes a zero vector part 11 generating no effective voltage, that is, causing no fluctuation in voltage, a plurality of small vector parts 13 having a pair of voltage vectors generating the same output voltages, a plurality of middle vector parts 15 and a plurality of large vector parts 17. The zero vector part 11 includes, as depicted, the vectors generating no effective voltage, such as in (1,1,1), (0,0,0) and (-1,-1,-1).

The small vector parts 13 are comprised of upper small vector parts and lower small vector parts depending upon the condensers 1 and 2 being charged and discharged. The upper small vector parts have the voltage vectors of (1,0,0), (1,1,0), (0,1,0), (0,1,1), (0,0,1) and (1,0,1) which output the voltages of the condenser 1 over the neutral point 3. The lower small vector parts have the voltage vectors of (0,0,-1), (-1,0,-1), (-1,0,0), (-1,-1,0), (0,-1,0), and (0,-1,-1) which output the voltages of the condenser 2 below the neutral point 3. The middle vector parts 15 include the voltage vectors of (1,0,-1), (0,1,-1), (-1,1,0), (-1,0,1), (0,-1,1) and (1,-1,0), and the large vector parts 17 include the voltage vectors of (1,1,-1), (-1,1,-1), (-1,1,1), (-1,-1,-1), (1,1,1) and (1,-1,-1).

Figure 3:
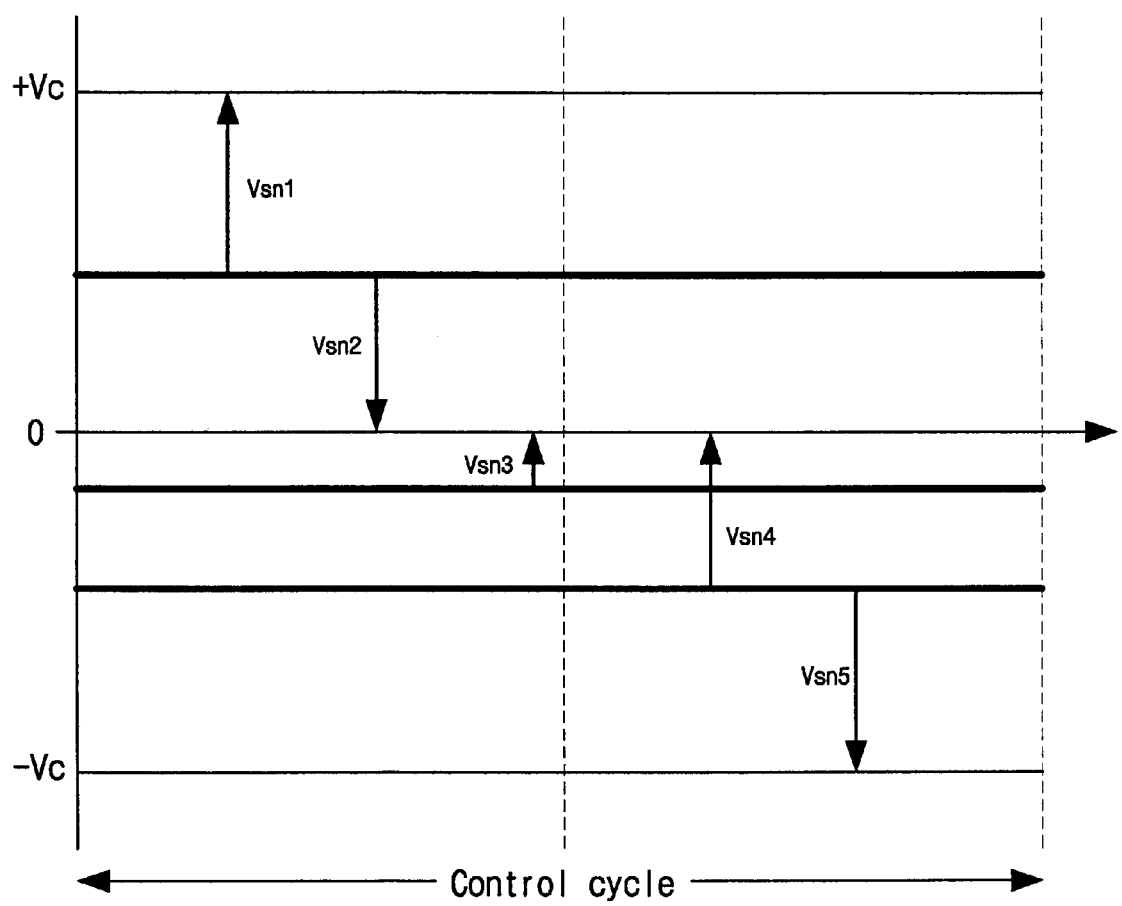
FIG. 3 is a view showing a state of an effective offset voltage in the three-level inverter according to the present invention.
Figure 4:
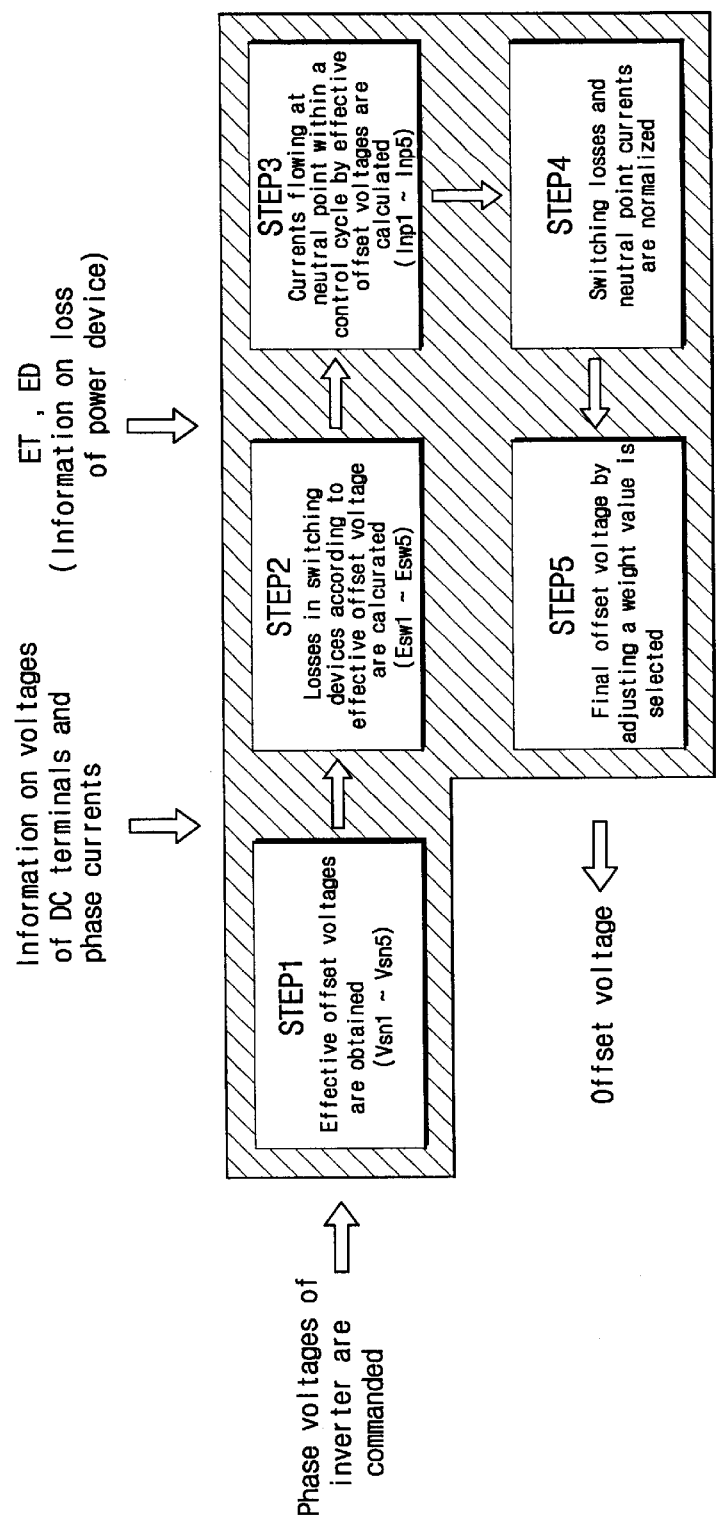
FIG. 4 is a block diagram showing a control flow according to the present invention.

Referring to FIGS. 3 and 4, in the three-level inverter, 2 to 5 effective offset voltages can be obtained within an established control cycle (Step 1). FIGS. 3 and 4 show five effective offset voltages (Vsn1, Vsn2, Vsn3, Vsn4 and Vsn5).

Switching does not occur in a phase where a pole voltage obtained by adjusting phase voltages with the effective offset voltages is fixed at one of electric potentials, +Vdc, 0 and -Vdc, and therefore loss in switching occurs at the other two free phases. The characteristics of the switching loss vary depending upon the polarity relation between the pole voltage and the phase current. That is, if the polar voltage and the phase current have the same polarity, switching occurs in one switching device and one diode within a control cycle, whereas switching occurs in one switching device and three diodes if they have different polarities.

Considering the characteristics of the switching loss, the switching loss generated when the respective offset voltages are supplied is calculated (Step 2). Because the voltages of the DC terminals vary according to the current flowing at the neutral point in the three-level inverter, the current flowing at the neutral point within the established control cycle when the offset voltages are supplied is calculated (Step 3). Based on the switching loss calculated in the switching part and the current flowing at the neutral point 3, the switching loss calculated and the current flowing at the neutral point 3 are normalized according to the respective effective offset voltages (Step 4).

The normalization of the switching loss is obtained by calculating a first loss difference between the maximum switching loss and the minimum switching loss, second loss differences between the maximum switching loss and the respective switching losses, and dividing the second loss differences by the first loss difference, as referred to in equation (1).

$$E^-_{swl\sim5} = \frac{\text{MAX}(E_{sl\sim5}) - E_{swl\sim5}}{\text{MAX}(E_{sl\sim5}) - \text{Min}(E_{swl\sim5})} \quad (1)$$

The equation (1) means that the switching loss becomes smaller as the normalization value relative to the effective offset voltage gets larger.

The normalization of the current flowing at the neutral point is obtained by calculating a first current difference between the maximum current value and the minimum current value to remove an unbalance of the DC terminals relative to a command current value of the neutral point, second current differences between the maximum current value and the respective current values, and then dividing the second current differences by the first current difference, as $$\nabla I^-_{npl\sim5} = \frac{\text{MAX}(\nabla I_{npl\sim5}) - \nabla I_{npl\sim5}}{\text{MAX}(\nabla I_{npl\sim5}) - \text{Min}(\nabla I_{npl\sim5})} \quad (2)$$

referred to in equation.

Here, $\nabla I_{np1\sim5}$ indicates the difference between the neural point current obtained from Step 3 and the command current value of the neutral point for removing the unbalance of the DC terminals. As the normalized value relative to each effective offset voltage gets larger, the unbalance becomes reduced.

An offset value having the maximum value among resultant values obtained by adding a certain weight to the normalization values calculated in Step 4 (Step 5), is selected. As the normalization value of the switching loss relative to each effective offset value gets larger, the switching loss becomes smaller. As the normalization value of the current flowing at the neutral point 3 gets larger, the unbalance between both ends of the DC terminals is decreased. The two normalization values can be adjusted in terms of the switching loss of the inverter and the balance of the DC terminals by adjusting the weights added to the normalization value. Therefore, the switching loss of the inverter can be reduced while maintaining the voltage balance of the DC terminals, by establishing appropriate weights and selecting appropriate offset values as described above.

According to the present invention, the pulse width modulation method for the three-level inverter does not require an additional hardware (equipment or device, etc.) to decrease an electric loss of the inverter. Thus, the pulse width modulation method can be applied to the inverters irrespective of their capacity, and also to the conventional inverters, thereby giving no burden to a CPU. The pulse width modulation method according to the present invention is effective for a heat-sink design by means of the decreased switching loss, and allows manufacture of miniaturized and lightweight inverters. If an integrated power semiconductor having a three-level inverter is developed, the method of the present invention can be applied in a various manner, and can increase an applicability to control of motors.

Following the pulse width modulation method according to the present invention, effective offset voltages are obtained, and loss in switching according to each effective offset voltage and current flowing at a neutral point within a control cycle according to each effective offset voltage is calculated. After normalizing the switching loss and the neutral point current, the switching loss may be reduced and the voltage unbalance at the DC terminals may be minimized by adjusting weights relative to the normalized switching loss and neutral point current so as to select an appropriate offset voltage.

As stated above, according to the pulse width modulation method of the present invention, the switching loss of the inverter may be reduced and the voltage balance at the DC terminals may be maintained. Additionally, the three-level inverter may be extended to construction for medium- or small-sized capacity.

Although the present invention has been described in connection with preferred embodiments thereof, it will be appreciated by those skilled in the art that additions, modifications, substitutions and deletions not specifically described may be made without departing from the spirit and scope of the invention as defined in the appended claims.

What is claimed is:

1. A pulse width modulation method of a three-level inverter comprising a pair of condensers connected in series to each other, having a neutral point, and a plurality of switching devices, comprising the steps of:

obtaining effective offset voltages within an established control cycle of the inverter;

calculating a switching loss in the switching devices according to each effective offset voltage supplied to the inverter;

calculating a current flowing at the neutral point within the control cycle when each effective offset value is supplied;

normalizing the calculated switching loss and the current flowing at the neutral point; and adding a predetermined weight to at least one of the normalized switching loss and the normalized neutral point current to select the offset voltage where the sum of the normalized switching loss and the normalized neutral point current is maximized.

2. The method according to claim 1, wherein the switching loss calculation step comprises the sub-steps of:

obtaining a first loss difference between the maximum switching loss and the minimum switching loss;

obtaining second loss differences between the maximum switching loss and the respective switching losses; and dividing each second loss difference by the first loss difference.

3. The method according to claim 1, wherein the neutral point current calculation step comprises the sub-steps of:

obtaining a first current difference between the maximum current value and the minimum current value;

obtaining second current differences between the maximum current value and the respective minimum current values; and dividing each second current difference by the first current difference.

* * * * *